United States Patent Office 2,731,898
Patented Jan. 24, 1956

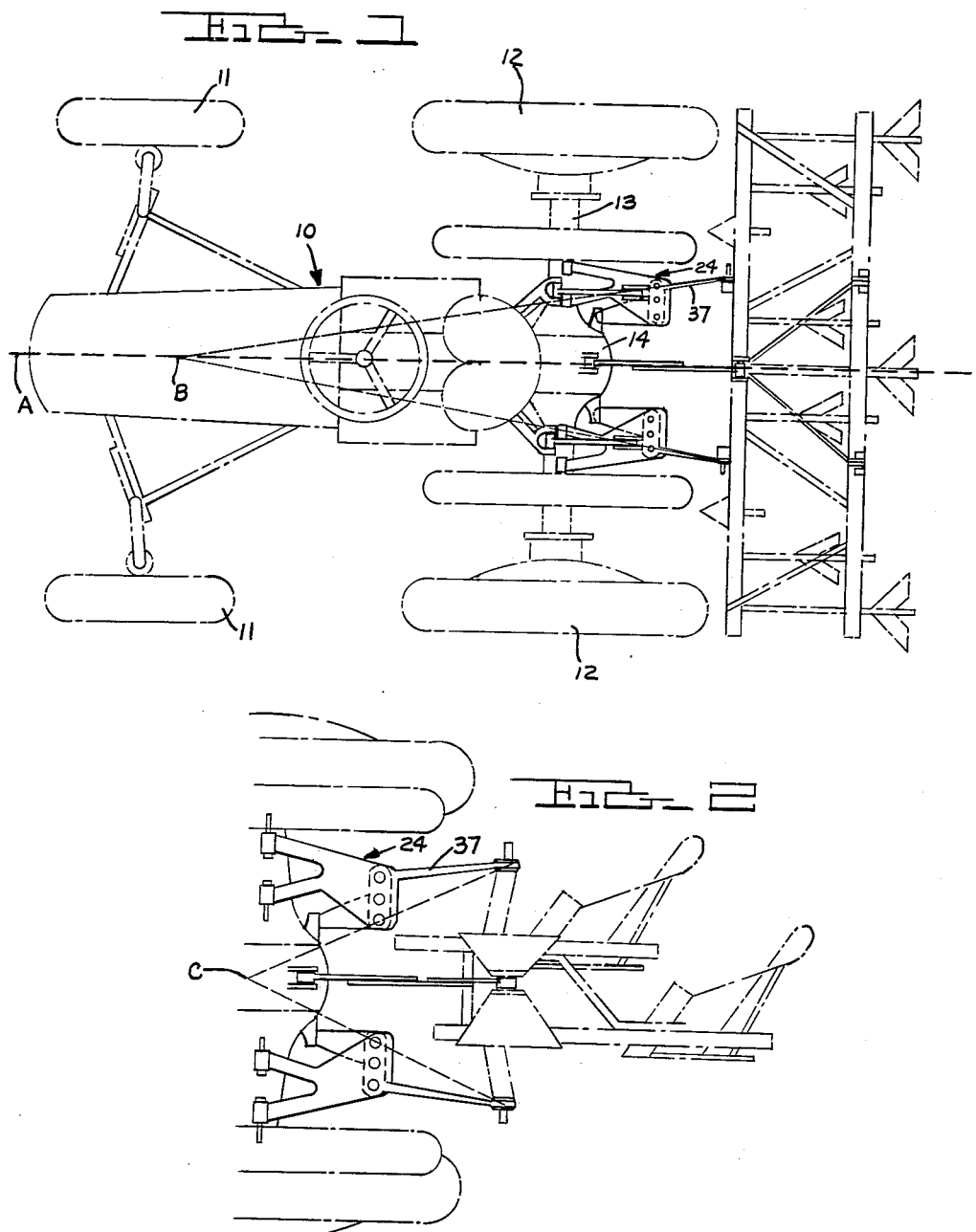

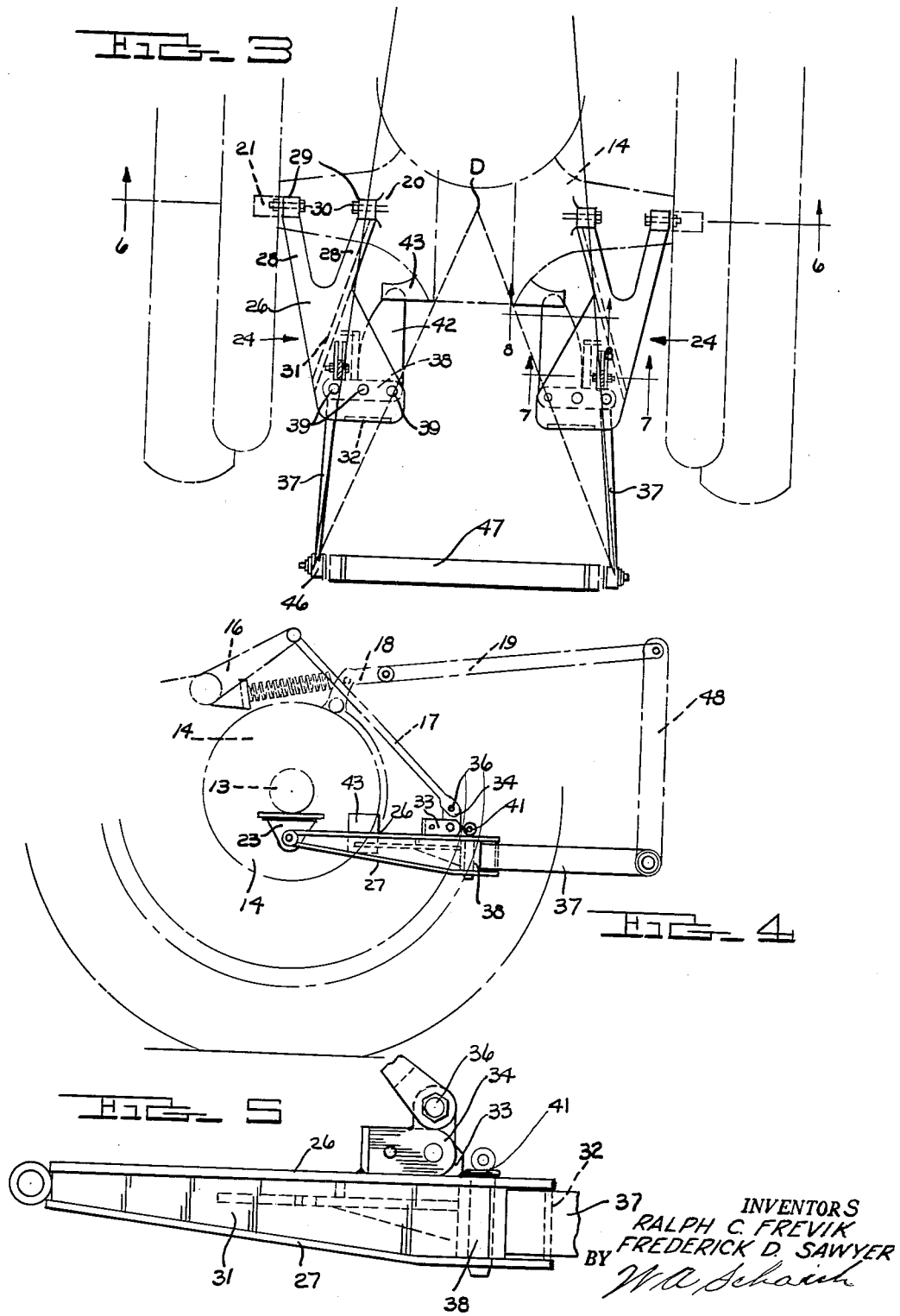

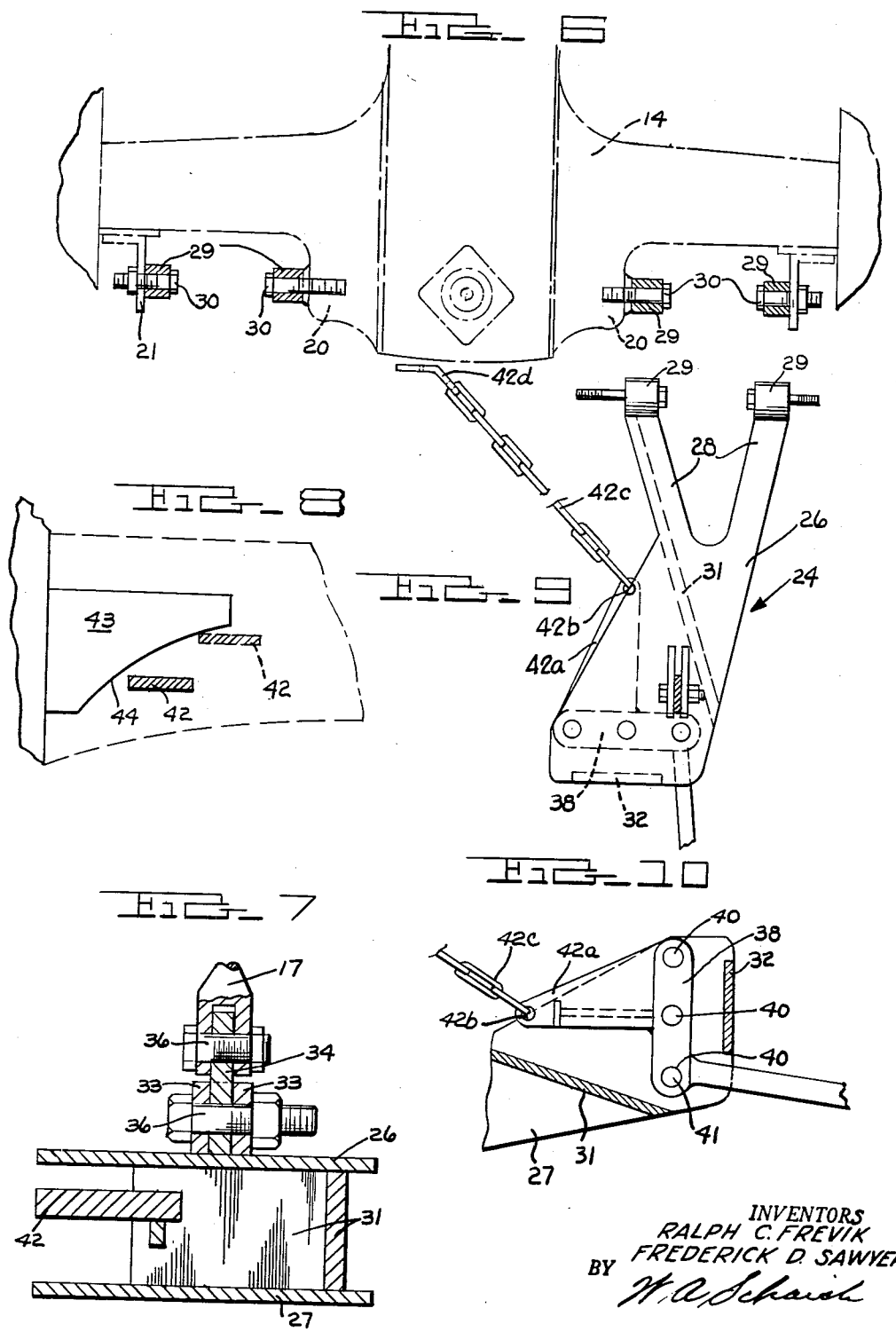

2,731,898

IMPLEMENT HITCH FOR TRACTORS

Ralph C. Frevik, Detroit, and Frederick D. Sawyer, Wayne, Mich., assignors, by mesne assignments, to Ford Motor Company, Dearborn, Mich., a corporation of Delaware Application June 30, 1951, Serial No. 234,597

4 Claims. (Cl. 97—47.65)

The present invention relates to an implement hitch for tractors and more particular to an implement hitch having trailing, forwardly converging hitch links, each of which comprises a plurality of longitudinally aligned link elements, the links being laterally adjustable relative to one another for forward convergence at longitudinally spaced points in a vertical tractor-implement draft plane to vary the implement steering point relative to a tractor steering axle.

In many tractor-drawn ground-engaging farm implements, such as moldboard and disc plows, the ground-engaging elements are angularly disposed with respect to the longitudinal tractor line of draft, so that draft forces on the implement are resolved into longitudinal pulling forces and lateral side draft forces. A portion of the side draft forces are imposed upon the tractor itself, so as to materially interfere with steering of the tractor, particularly where the implement is pulled by means of laterally spaced universally pivoted trailing draft links which are forwardly converging. Actually, the side draft forces on the tractor are effectively imposed at the theoretical convergence point of the hitch links, which point conventionally falls at or near the front steering axle of the tractor.

In other implements, such as cultivators and the like, the ground-engaging elements are longitudinally aligned with the longitudinal tractor line of draft, so that no substantial unbalanced side draft forces are generated during implement use. In the use of this type of implement, the locating of the point of the theoretical hitch link convergence near the tractor front axle is desirable, inasmuch as the implement thus tends to follow the steering of the tractor.

Therefore, it will be appreciated that it would be desirable to provide means which are conveniently adjustable to vary the theoretical point of convergence of trailing hitch links, so that the implement steering point may be adjusted in accordance with the character of the implement being carried by the hitch links. In the case of implements generating substantial side draft forces, the implement steering point should be imposed in the vicinity of the point of intersection of the rear axle of the tractor and the tractor vertical draft plane, so that there is no substantial side draft interference with steering of the tractor. On the other hand, in the utilization of implements generating appreciable unbalanced side draft forces, the implement steering point and the tractor steering axle should approximately coincide. At the same time, such variation of convergence should not interfere with the power-lifting of the hitch links.

The present invention provides a means whereby the effective implement attachment or steering point on the tractor may be so varied. Structurally, this desirable end is attained by utilizing a pair of hitch links comprising longitudinally aligned hitch link elements which are relatively pivotable about axes laterally shiftable relative to the tractor. More specifically, one of the link elements of each link is pivotally attached to the tractor for movement in a single plane relative thereto while the other element of each link is pivotally attached to the first link for movement relative thereto in a second plane. The point of pivotal attachment of the link elements for relative swinging movement in a horizontal plane is adjustable, so that the theoretical point of convergence of the two links, and consequently the effective implement attachment or steering point, can be located at a plurality of points along a vertical draft plane of the tractor.

It is, therefore, an important object of the present invention to provide an implement tractor hitch link wherein the steering point of an implement attached to the link may be varied with respect to the tractor line of draft in accordance with the character of the implement.

Another important object is the provision of a tractor hitch link which provides for movement of an implement carried thereby in a plurality of planes angularly disposed with respect to one another while accommodating variance in the effective steering point of the implement relative to the tractor.

It is a further object of the present invention to provide a pair of implement hitch links each having longitudinally aligned, trailing hitch link elements adjustable with respect to one another and with respect to a tractor to vary the effective point of forward convergence of the pair of hitch links, so that the effective implement attachment or steering point may be selected with respect to the tractor steering point in accordance with side draft forces generated during utilization of the implement.

Still another important object is the provision of an implement hitch link including a pair of longitudinally aligned hitch link elements relatively pivotable in a horizontal plane, the forward one of the elements being adapted for pivotal attachment to a tractor for movement in a vertical plane, and the rear one of the elements being adapted for attachment to an implement.

Yet another important object is to provide an implement hitch including a pair of power-liftable hitch links each comprising a pair of longitudinally aligned relatively pivotal hitch link elements and each of the links being provided with means for preventing excessive relative pivoting movement of the link elements and for centering the same upon power-lifting of said links.

The specific nature of this invention, as well as other objects and advantages thereof, will become apparent to those skilled in the art from the following detailed description, taken in conjunction with the attached sheets of drawings on which, by way of preferred example only, is illustrated several embodiments of this invention.

On the drawings:

Figure 1 is a plan view of a hitch link of the present invention joining a tractor, shown in dotted outline, to an implement, also shown in dotted outline, so that the steering point of the implement substantially coincides with the steering of the tractor;

Figure 2 is a fragmentary plan view similar to Figure 1 illustrating a different type of implement, with the implement steering point falling approximately at the tractor rear axle;

Figure 3 is an enlarged fragmentary plan view similar to Figure 2;

Figure 4 is a side elevational view of the hitch of Figure 3, wherein one rear wheel of the tractor has been removed for clarity;

Figure 5 is a greatly enlarged fragmentary side elevational view similar to Figure 4;

Figure 6 is a fragmentary sectional view taken along the plane VI—VI of Figure 3;

Figure 7 is a fragmentary sectional view taken along the plane VII—VII of Figure 3;

Figure 8 is a fragmentary sectional view taken along the plane VIII—VIII of Figure 3;

Figure 9 is a fragmentary plan view showing a modified form of the hitch link of the present invention;

Figure 10 is a fragmentary sectional view further illustrating the modified form of Figure 9.

As shown on the drawings:

In Figures 1–9, reference numeral 10 refers generally to a well-known type of tractor having laterally spaced steerable front wheels 11 located on opposite sides of the longitudinal central vertical draft plane A of the tractor. The tractor 10 is also provided with rear wheels 12 mounted on a laterally extending rear axle 13 confined within an axle housing 14. Atop the rear axle housing are located a pair of laterally spaced, power-liftable rock arms 16 universally pivoted or otherwise secured to depending lift links 17. The rear axle housing 14 also carries an upwardly projecting bracket 18 carrying a rearwardly projecting top link 19.

Laterally spaced portions of the rear axle housing 14, located on opposed sides of the vertical plane A, are provided with integrally formed or fixedly secured attachment bosses 20 (Figure 3), while additional laterally spaced brackets 21 are also carried by the rear axle housing outwardly of and laterally aligned with the bosses 20.

Secured to the bosses 20 and the brackets 21 are trailing hitch links of the present invention. The hitch links each comprise a forward element 24 having vertically spaced upper and lower plates 26 and 27, respectively, which are identical in configuration to provide forwardly extending laterally spaced yoke arms 28, each terminating in aligned, laterally bored attachment bosses 29. The attachment bosses 29 are respectively secured to the bosses 20 and the brackets 21 carried by the rear axle housing by a suitable means, as by pivot bolts 30. The pivot bolts 30 are laterally aligned, and it will be seen that the forward link elements are thus pivotally supported for vertical movement relative to the tractor about the pivotal axis provided by the bolts 30.

The upper and lower forward hitch element plates 26 and 27, respectively, are joined by means of laterally and rearwardly extending interposed webs 31 (Figure 5) by which maintain the plates in spaced relation, and by similar vertically extending webs 32 located at the extreme rear of the forward element plates. The upper plate 26 of each of the forward elements is provided with a pair of closely laterally spaced upstanding bracket arms 33 having interposed therebetween a crank arm 34 which is pivotally secured, as by bolts 36, to the bracket arms 33 and the free terminal end of the depending lift links 17, respectively.

Thus, it will be seen that each of the forward elements 24 of the hitch link assembly may be elevated and lowered in a vertical plane by actuation of the power-lift arms 16 and the lift links 17. Such vertical movement is accommodated by the pivoted attachment of the forward hitch elements to the tractor rear axle housing, as by the pivot bolts 30.

Rear hitch link elements are provided by rearwardly extending arms 37 having forward laterally extending projections or crank arms 38 which are interposed between the plates 26 and 27 of the forward hitch elements. The rear hitch elements are forwardly converging, while the projections 38 are substantially normally disposed with respect thereto, the arms and the projections being rigidly secured to one another or integrally formed for concurrent movement. As assembled, the projections 38 of the arms 37 lie intermediate the webs 31 and 32 which rigidly join the plates 26 and 27. The rearward extremities of the plates 26 and 27 are each provided with a plurality of laterally aligned apertures 39, the apertures 39 of the plates 26 and 27, respectively, also being vertically aligned with one another and with vertical apertures 40 formed in the projections 38. The aligned apertures 38 and 40 of the plates 26, 27 and of the projections 38, respectively, are adapted to receive elongated vertically extending pivot pins 41 (Figure 5), and it will be seen that the center of relative pivoting movement between the forward and rearward hitch link elements may be laterally shifted by placing the pivot pin in one or another of the vertically aligned series of apertures.

The projections 38 are each provided with a forwardly projecting limit arm 42 which extends forwardly and slightly inwardly alongside the forward hitch link elements 24. The limit arms 42 are provided for coaction with laterally projecting limit cams 43 formed on rear axle housing 14 and having concave undersurfaces 44 laterally aligned with and adapted to receive the inner edges of the limit arms, respectively. When the hitch links are in their normal, lowered working positions, the inner edges of the arms 42 are laterally spaced from the concave cam surfaces 44. However, excessive lateral swaying of the hitch link rear elements to either side will bring one or the other of the limit arms 42 into contact with the corresponding cam surface 44. Thus lateral swaying is limited by coaction of the arms 42 and the cams 43.

Upon elevation of the hitch links by actuation of the rock arms 16 and the lift links 17 to pivot the links about the pivot pins 30, the inner edges of the arms 42 will contact the upper, laterally outwardly directed portions of the cam undersurface 44, thereby tending to spread the arms 42. Since the distance between the rear free ends of the rear arms 37 is fixed by attachment of the free ends of arms 37 to laterally fixed points of the implement, the attempted spreading of the forwardly projecting arms 42 results in centering of the rear elements by pivoting movement of the rear elements about the pivot pins 41. Further, the complete hitch link structure is rigidified in its elevated position. Thus, the implement, when in elevated position, is both centered and rigidified for proper transportation.

In the modified form of the invention illustrated in Figures 9 and 10, identical reference numerals refer to correspondingly identical portions of the structure heretofore described. The only structural change involved in the modified embodiment resides in the shortening of the limit arms 42a, the elimination of the cams 43 and the substitution therefor of a pair of check chains 42c. The check chains 42c extend from the limit arm 42a to the rear axle housing 14. More specifically, the chains 42c extend through an aperture 42b in the free end of the arm 42a and through a rear axle housing ring 42d secured to the rear axle housing 14 by conventional bolt means not shown. One or the other of the chains is drawn taut by lateral swaying of the hitch links, thereby limiting implement side sway, and both chains are taut at the upper limit of link elevation to center and rigidify the linkage assembly. Thus, the chains function in much the same manner as the cam surface 44 hereinbefore described in detail.

The rearwardly extending link arms 37 terminate in segmental spherical-type universal joints 46 which are adapted for attachment to laterally spaced points of an implement such as the ends of an implement drawbar 47 (Figure 3). Connection of the implement to the tractor is completed by the pivoted connection of the top link 19 to a point of the implement vertically spaced from the points of connection of the rear link elements. For example, the top link may be connected to a vertically extending implement frame element 48, such as an implement A-frame.

Operation

As hereinbefore explained, the present invention provides means for varying the effective steering point of an implement carried by forwardly converging, laterally spaced, trailing hitch links. The structure for carrying out this purpose has been hereinbefore set forth in some detail, and the following operational summary is intended to be merely exemplary.

In utilization of implements such as cultivators or the like which are ground-engaging but which impose no substantial side draft forces upon the tractor, it is desirable to have the theoretical point of convergence of the trailing hitch links and the front axle of the tractor coincide. The structure of the present invention is adapted for this type of operation as illustrated in Figure 1 of the drawings.

The pivot pin 41 joining the forward and rear hitch link elements for pivoted movement is positioned in the laterally outwardly extreme apertures of the series of vertically aligned apertures 39 and 40 located in the forward hitch element plates 26, 27 and the hitch link arm projections 38, respectively. Thus, pivoting movement of the implement drawbar 47 through the rear arms 37 must occur about the selected pivot point, and steering movement of the implement must occur about a steering point B which coincides approximately with the location of the tractor front wheel axle. Implement steering about the point B falls within an arc having the point B as its center and the distance from the point B to the ends of the implement drawbar 47 as its radius.

In the utilization of a ground-engaging implement which imposes substantial side draft forces upon the tractor, steering about a forwardly located steering point, such as the point B, is undesirable for the reasons hereinbefore considered. Because of the side draft forces involved, it is desirable to steer the implement about the point which is substantially aligned with the rear axle housing of the tractor and removed from the tractor front axle. Such steering is effected by placing the pivot pin 41 in the laterally innermost vertically aligned apertures 39 and 40 formed in the forward element plates 26—27 and the rear steering link projection 38, respectively. In this manner, the steering radii converge at approximately the center of the rear axle housing, as at the point D, and these radii are located by the alignment of the ends of the implement drawbar 47 and the pivot pins 41 as the same are laterally inwardly located.

Thus it will be seen that in the case of certain types of implements, the implement side draft forces may be localized at a point well removed from the tractor front axle.

As a matter of convenience and for possible utility with implements imposing an intermediate degree of side draft on the tractor, but which desirably should be steered in approximate conformity with the tractor, the pivot pin 41 may be located in the intermediate series of vertically aligned apertures 39 and 40, as will be apparent to those skilled in the art.

It will be appreciated that the rear link elements are free for relative lateral movement about the pivot pins 41. Such movement is desirable to accommodate lateral implement sway, but the sway of the implement must be limited to avoid interference with the rear tractor wheels, and also the implement must be centered and laterally rigid when elevated to a carrying position by means of the lift assembly 16 and 17.

This limiting of lateral sway is obtained by alternate constructions of the present invention. In the embodiment of Figures 1–8, inclusive, the centering arms 42 cooperate with the camming surfaces 44 to limit side sway and, when the hitch link assembly is elevated, the arms 42 ride upwardly on the surfaces 44 until, at an extreme raised or carrying position, the arms are held in contact therewith to prevent any lateral shifting of the rear link elements.

A similar limiting of lateral sway is obtained by the use of the limiting chains 42c. The check chains limit lateral movement and are pulled taut when the implement is elevated to center the hitch links and to prevent any lateral shifting whatsoever.

In summary, the present invention provides a hitch link which is power-liftable by utilization of the tractor power-lift mechanism, and which is adjustable to vary the point of forward convergence of the trailing hitch link elements to suit the individual steering characteristics desired of the tractor-implement combination. The forward hitch link elements are adapted for pivoted movement relative to the tractor in a single plane, specifically in a vertical plane, while the rear hitch link elements are adapted for pivoting movement in a second plane which is normal to the plane of movement of the forward elements, specifically in a substantially horizontal plane.

Movement in the horizontal plane accommodates free lateral implement movement relative to the tractor within the limits imposed by the cam mechanism or check chains as described above. Any such side sway or implement lateral movement may be prevented by the use of a plurality of hitch pins located in three or more of the aligned series of vertical apertures 39 and 40. In this manner, pivoting movement in a horizontal plane is prevented and conventional stabilizing bars need not be used.

Upon vertical lift movement of the hitch link assembly, the implement will be elevated for transportation and/or for controlling the implement draft or depth cut as is conventional in tractor-implement combinations of this type. Further, the implement will be laterally centered with respect to the vertical draft plane of the tractor upon elevation of the hitch links by coaction of the camming means or by tightening of the check chains, and the lateral centering of the implement will also cause a laterally rigid tractor-implement connection.

Another advantage of the present invention resides in the limiting of pivoting movement of each link element to a single plane. Thus, it is unnecessary to provide expensive and complicated universal joints between the rock arms 16 and the lift arms 17, as is necessary in conventional single hitch links which are movable both laterally and vertically.

It will, of coure, be understood that various details of construction may be varied through a wide range without departing from the principles of this invention and it is, therefore, not the purpose to limit the patent granted hereon otherwise than necessitated by the scope of the appended claims.

We claim:

1. In an implement hitch for a tractor, a pair of trailing laterally spaced draft links convergent toward a central vertical draft plane of the tractor and each of which comprises a forward link element attachable to said tractor for free vertical swinging movement about an axis located on the tractor and having a rearwardly extending free end, a rear link element pivotally attached to the rear end of said forward element for horizontal swinging movement about an axis rearwardly of and spaced from said tractor, means extending from said rear element to said tractor for limiting free horizontal movement thereof, and means at the free rearward end of said rear element for attachment to an implement.

2. In a hitch for attaching an implement to the rear end of the tractor, a pair of laterally spaced trailing draft links each of which comprises a pair of longitudinally aligned link elements attachable to the tractor and to the implement respectively, correspondingly adjacent end portions of said link elements overlapping and being provided, respectively, with a series of vertically registering laterally aligned apertures, and a pivot member selectively insertable through vertically aligned apertures in both of said elements to provide a pivot axis about which said elements are relatively movable in a horizontal plane about a selected forwardly located theoretical convergence point determined by the lateral location of the aligned apertures through which said pivot member is inserted.

3. In a hitch for attaching an implement to the rear end of a tractor, a pair of laterally spaced trailing hitch links each of which comprises a forward link element defined by spaced plates secured together for concurrent pivoting movement in a vertical plane about a forwardly located horizontal axis lying within the confines of the tractor, said plates having vertically registering horizontally aligned apertures adjacent the trailing edges thereof, a rear link element having a rearwardly extending arm substantially longitudinally aligned with said forward element and a laterally extending crank arm interposed between said plates, said crank arm having vertical apertures therethrough registerable with said plate apertures, a pivot member selectively insertable through registering plate and crank arm apertures to provide a vertical axis about which said rear element is pivotable in a horizontal plane with said vertical axis being laterally shiftable as said pivot member is inserted through the various registering apertures, and means on the etxreme rear end of said rear element for attachment to the implement, whereby said implement is steerable about a point variable along the tractor vertical draft plane in accordance wtih the lateral positioning of said pivot member.

4. In a hitch for attaching an implement to a tractor, a pair of laterally spaced forwardly converging draft links each of which comprises two longitudinally aligned separable sections, the forward one of which is adapted for attachment adjacent its forward end to the tractor and the rear one of which is adapted for attachment adjacent its rear end to the implement, corresponding free portions of said sections overlapping one another intermediate the tractor and the implement and having laterally spaced vertically alignable apertures therein, and pivot elements selectively insertable into said apertures to extend through the overlapping portions of said sections respectively to define pivot axes accommodating pivoting movement of said rear sections in a horizontal plane effectively about a forwardly located point of theoretical draft link convergence, lateral shifting of said pivot elements to different vertically registering apertures longitudinally shifting said point of theoretical convergence to vary the effective implement steering point relative to the tractor.

References Cited in the file of this patent

UNITED STATES PATENTS

| | | |
|---|---|---|
| 1,379,399 | Ferguson | May 24, 1921 |
| 1,846,489 | Johnson | Feb. 23, 1932 |
| 2,140,712 | Mitchell | Dec. 20, 1938 |
| 2,322,342 | Bunn | June 22, 1943 |
| 2,339,830 | Zink et al. | Jan. 25, 1944 |
| 2,398,365 | Ellis | Apr. 16, 1946 |
| 2,462,726 | Currie | Feb. 22, 1949 |
| 2,526,396 | Nowlin | Oct. 17, 1950 |
| 2,660,938 | Kaupke | Dec. 1, 1953 |

FOREIGN PATENTS

| | | |
|---|---|---|
| 568,420 | Great Britain | Apr. 4, 1945 |